(12) United States Patent
Vorenkamp et al.

(10) Patent No.: US 9,281,718 B2
(45) Date of Patent: *Mar. 8, 2016

(54) ON-BOARD POWER SUPPLY MONITOR AND POWER CONTROL SYSTEM

(75) Inventors: Pieter Vorenkamp, Laguna Niguel, CA (US); Neil Y. Kim, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 2575 days.

This patent is subject to a terminal disclaimer.

(21) Appl. No.: 11/157,577

(22) Filed: Jun. 21, 2005

(65) Prior Publication Data

US 2005/0289378 A1 Dec. 29, 2005

Related U.S. Application Data

(60) Provisional application No. 60/583,516, filed on Jun. 28, 2004.

(51) Int. Cl.
*G01R 21/00* (2006.01)
*H02J 13/00* (2006.01)

(52) U.S. Cl.
CPC ........... *H02J 13/0003* (2013.01); *Y02B 90/228* (2013.01); *Y04S 20/18* (2013.01)

(58) Field of Classification Search
CPC .................................................. H02J 13/0003
USPC ............. 702/60–63, 57–59, 64, 65, 117, 118, 702/121, 122; 713/300–340; 716/4, 120, 716/126, 127, 132, 136
See application file for complete search history.

(56) References Cited

U.S. PATENT DOCUMENTS 6,289,467 B1 * 9/2001 Lewis et al. .................... 713/340
6,356,057 B1 * 3/2002 Shilo et al. ..................... 320/127
6,594,771 B1 7/2003 Koerber et al.

(Continued)

FOREIGN PATENT DOCUMENTS

CN 1427319 7/2003

OTHER PUBLICATIONS

Anonymous, "Integrated Voltage Regulator for an On-Card +1.7 Volt Power Supply", IBM Technical Disclosure Bulletin, New York, USA, vol. 31 No. 2, Jul. 1, 1988, pp. 22-23, XP002344799.

*Primary Examiner* — Sujoy Kundu
*Assistant Examiner* — Ricky Ngon
(74) *Attorney, Agent, or Firm* — Brinks Gilson & Lione

(57) ABSTRACT

A system and method for controlling characteristics of supplied electrical power. Various aspects of the present invention may comprise an integrated circuit comprising a first circuit module that receives electrical power. The integrated circuit may comprise a second circuit module that monitors at least one characteristic of electrical power received by at least one of the first circuit module and the integrated circuit. The second circuit module may also communicate with a third circuit module regarding the monitored at least one characteristic. Various aspects of the present invention may comprise an integrated circuit comprising a first module that monitors at least one characteristic of electrical power received by a first electrical device that is external to the integrated circuit. The integrated circuit may also comprise a second module that communicates with a second electrical device, external to the integrated circuit, regarding the monitored at least one characteristic.

31 Claims, 8 Drawing Sheets

(56) References Cited

U.S. PATENT DOCUMENTS 6,651,178 B1 * 11/2003 Voegeli et al. ............... 713/300
7,035,785 B2 * 4/2006 Grochowski et al. ........... 703/18
2004/0090219 A1   5/2004 Chapuis
2004/0123164 A1   6/2004 Chapuis et al.
2004/0268278 A1 * 12/2004 Hoberman et al. ............... 716/5
2006/0052958 A1 * 3/2006 Hancock et al. ............... 702/60

* cited by examiner

ON-BOARD POWER SUPPLY MONITOR AND POWER CONTROL SYSTEM

CROSS-REFERENCE TO RELATED APPLICATIONS/INCORPORATION BY REFERENCE

This patent application is related to and claims priority from provisional patent application Ser. No. 60/583,516, filed Jun. 28, 2004, and entitled "ON-BOARD POWER SUPPLY MONITOR AND POWER CONTROL SYSTEM," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Electronic systems may utilize a variety of sub-systems or sub-circuits, each of which may require a source of electrical power. Such electronic systems or circuits may utilize a single source of electrical power or multiple sources of electrical power. For example, such systems or circuits may incorporate any of a large variety of power supply circuits or modules.

Characteristics of electrical power supplied to electrical systems may vary over time or exhibit non-uniform behavior across a cross-section of a system or circuit. For example and without limitation, power supply voltage characteristics associated with a particular power supply may vary across a circuit board. Such variations may be caused by any of variety of causes, including, for example, line loss, current fluctuation, varying noise conditions, varying operating environment, etc. Therefore, in various scenarios, electrical circuits might not receive respective supplies of electrical power having the characteristics that the electrical circuits were designed to receive. For example, an electrical circuit may receive electrical power having characteristics that degrade the performance of the circuit.

Systems may utilize power supplies with regulated outputs. For example, a power supply circuit may output power at a particular regulated voltage level within tolerance limits. However, for reasons stated previously, even though characteristics of power output from the power supply circuit may be regulated, often the characteristics of power output from a power supply circuit to an electrical circuit may be significantly different than the characteristics of power received by the electrical circuit.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method for controlling characteristics of supplied electrical power, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
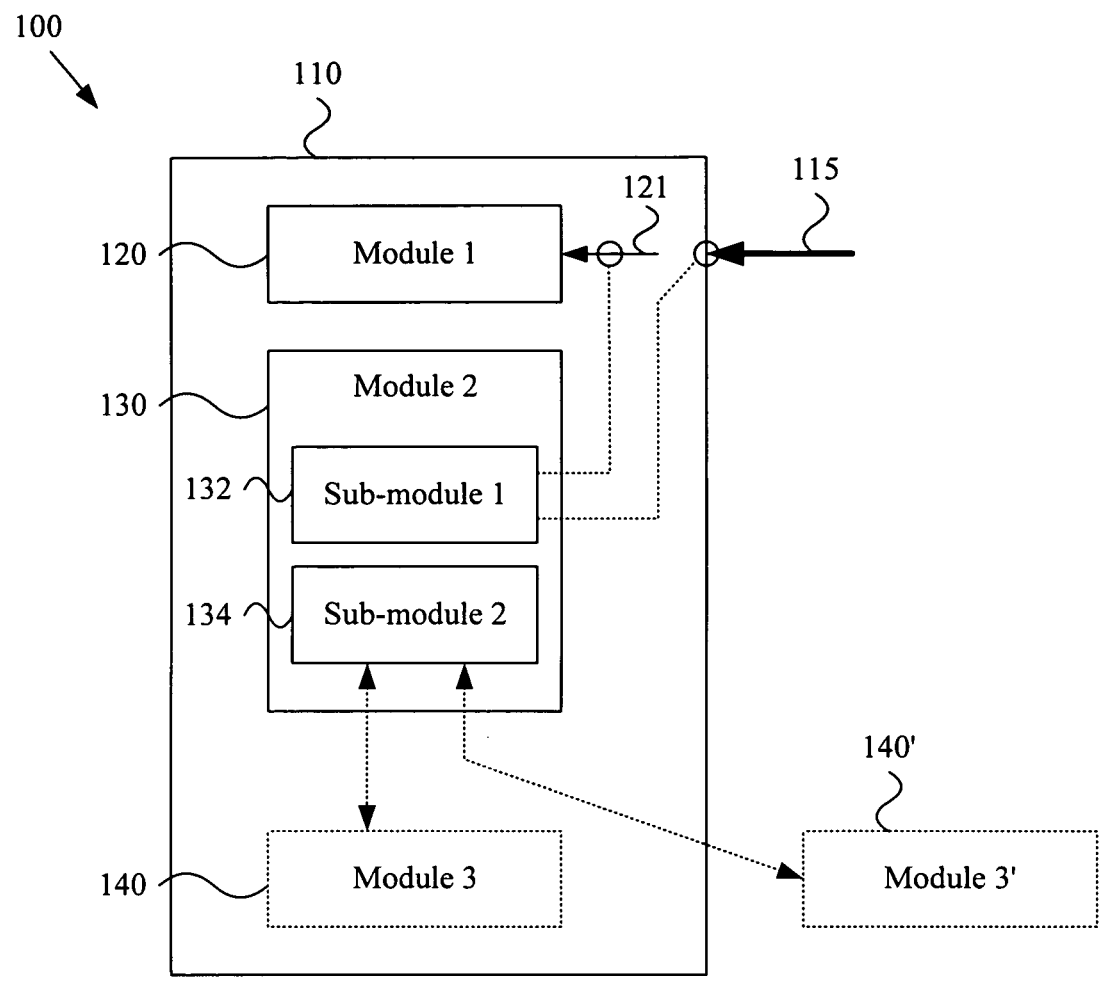
FIG. 1 shows a diagram of an exemplary power control system, in accordance with various aspects of the present invention.

FIG. 1 shows a diagram of an exemplary power control system 100, in accordance with various aspects of the present invention. The exemplary system 100 may comprise an integrated circuit 110 that receives electrical power 115. The integrated circuit 110 may comprise characteristics of any of a large variety of integrated circuits. For example and without limitation, the integrated circuit 110 may comprise a signal processing circuit, a microprocessor, an application-specific integrated circuit, a programmable logic array, a memory circuit, a multi-chip module, a microcontroller, etc. Accordingly, the scope of various aspects of the present invention should not be limited by characteristics of a particular integrated circuit type.

The exemplary integrated circuit 110 may comprise a first circuit module 120 that receives electrical power 121. The electrical power 121 may, for example, be identical to the electrical power 115 received by the integrated circuit 110 or may be different. For example, the electrical power 121 received by the first circuit module 120 may be related to (e.g., derived from) the electrical power 115 received by the integrated circuit 110 or may be independent. Accordingly, the scope of various aspects of the present invention should not be limited by characteristics of any relationship between electrical power received by the integrated circuit 110, the first circuit module 120, or any other module or component.

The first circuit module 120 may comprise characteristics of any of a large variety of circuit modules. For example and without limitation, the first circuit module 120 may comprise a signal processing module, a microprocessor module, an application-specific module, a programmable logic array module, a memory module, a plurality of coupled sub-modules, a microcontroller module, etc. Accordingly, the scope of various aspects of the present invention should not be limited by characteristics of a particular circuit module type.

The exemplary system 100 may comprise a second circuit module 130. The exemplary second circuit module 130 may comprise a first sub-module 132 and a second sub-module 134. The second circuit module 130 may, for example and without limitation, comprise a power monitor module that monitors characteristics of electrical power and communicates information related to such monitoring activity.

The first sub-module 132 may, for example, monitor at least one characteristic of electrical power 115 received by the integrated circuit 110. Also for example, the first sub-module 132 may monitor at least one characteristic of electrical power 121 received by the first circuit module 120. Note that the first sub-module 132 may monitor at least one characteristic of electrical power received by the integrated circuit 110 and/or the first circuit module 120.

Monitored characteristics of electrical power may comprise any of a variety of electrical power characteristics. For example and without limitation, such characteristics may comprise electrical voltage characteristics such as, for example, voltage level (e.g., relative level or absolute level), voltage stability (e.g., voltage drift, voltage ripple and disturbance response characteristics), and noise. Also for example, such characteristics may comprise electrical current characteristics such as, for example, current level (e.g., relative level or absolute level), current stability (e.g., current fluctuation, current ripple, and disturbance response characteristics). Further for example, such characteristics may comprise various electrical power characteristics such as, for example, power level, energy level, etc. In general, the monitored characteristics of electrical power may comprise any of a variety of electrical power characteristics. Accordingly, the scope of various aspects of the present invention should not be limited by characteristics of one or more particular electrical power characteristics.

It should be noted that the first sub-module 132 may monitor one or more characteristics for a plurality of electrical power inputs received by at least one of the integrated circuit 110 and the first circuit module 120. For example, the first circuit module 120 may receive a plurality of electrical power inputs (e.g., a 1.0V input, 1.2V input and 2.5V input), characteristic(s) of which the first sub-module 132 may monitor. Accordingly, the scope of various aspects of the present invention should not be limited by a particular number of monitored power inputs to an integrated circuit and/or circuit module.

Note that the first sub-module 132 may utilize any of a large variety of known or yet to be developed devices to monitor electrical power characteristics. Accordingly, the scope of various aspects of the present invention should not be limited by characteristics of particular devices or methods for monitoring various electrical power characteristics.

The exemplary system 100 illustrates the first sub-module 132 monitoring at least one characteristic of electrical power received by the integrated circuit 110 and/or the first circuit module 120. The first sub-module 132 may also, for example, monitor at least one characteristic of electrical power received by other circuit modules of the integrated circuit 110. Accordingly, the scope of various aspects of the present invention should not be limited by a particular number of circuit modules for which characteristics of received electrical power may be monitored by the first sub-module 132.

The second circuit module 130 of the exemplary system 100 may comprise a second sub-module 134, communicatively coupled to the first sub-module 132, that communicates with a third circuit module 140, 140' regarding the at least one characteristic monitored by the first sub-module 132. As illustrated in FIG. 1, the third circuit module 140, 140' may be a third circuit module 140 internal to the integrated circuit 110 or may be a third circuit module 140' external to the integrated circuit 110. Accordingly, the scope of various aspects of the present invention should not be limited by a particular location of the third circuit module 140, 140'.

The second sub-module 134 may communicate information with the third circuit module 140. Such information may, for example, comprise information of the at least one monitored characteristic. In an exemplary scenario where the first sub-module 132 monitors a voltage level characteristic of electrical power 121 received by the first circuit module 120, the second sub-module 134 may communicate information regarding the monitored voltage level with the third circuit module 140. For example, such information may comprise information (relative or absolute) describing the monitored voltage level. Such information may, for example, comprise relatively low-resolution information (e.g., a one-bit threshold comparison indication) or relatively high-resolution information (e.g., millivolt level resolution).

Also for example, the second sub-module 134 may communicate information with the third circuit module 140 that comprises power adjustment information. Such power adjustment information may, for example, comprise a request for power adjustment or a command for power adjustment. Such power adjustment information may comprise a request or command to adjust power by a relative amount or to an absolute amount. In an exemplary scenario where the first sub-module 132 monitors a voltage ripple characteristic, the second sub-module 134 may communicate information to the third circuit module 140 indicating that the voltage ripple level should be reduced. The complexity of the second sub-module 134 may vary greatly. For example, in a first exemplary scenario, the second sub-module 134 may comprise a plurality of signal processing sub-circuits, each of which performs a signal processing or communicating activity (e.g., A/D conversion, data manipulation, data packaging, one or two-way data communication, etc.). In a second exemplary scenario, the second sub-module 134 may comprise a mere conduit (e.g., a wire or optical path) for information obtained by the first sub-module 132. Accordingly, the scope of various aspects of the present invention should not be limited by characteristics of particular degrees of module complexity.

As mentioned previously, the first sub-module 132 may monitor a plurality of received power characteristics for a plurality of received power inputs for a plurality of circuit modules. Accordingly, the second sub-module 134 may communicate information with the third circuit module 140 regarding any, some or all of such monitored received power characteristics.

In general, the second sub-module 134 may communicate with a third circuit module 140, 140' regarding the at least one received power characteristic monitored by the first sub-module 132. Accordingly, the scope of various aspects of the present invention should not be limited by characteristics of a particular monitored power characteristic or a particular type of information that may be communicated regarding a monitored power characteristic.

As mentioned previously, the exemplary system 100 may comprise a third circuit module 140, 140' with which the second sub-module 134 may communicate information regarding the at least one monitored power characteristic. Also as previously discussed, the third circuit module 140 may be internal to the integrated circuit 110, or the third circuit module 140' may be external to the integrated circuit 110. The following discussion may refer to either the internal third circuit module 140 or the external third circuit module 140'. Such exemplary references are by no means to be construed as limiting various aspects of the third circuit module 140, 140' to an internal or external location relative to the integrated circuit 110.

For example and without limitation, the third circuit module 140 may comprise a power controller module. For example, the third circuit module 140 may process information received from the second sub-module 134 to determine power control information utilized to control power supply circuitry.

In an exemplary scenario where the third circuit module 140 is internal to the integrated circuit 110, the third circuit module 140 may receive information regarding the at least one monitored power characteristic from the second sub-module 134 and process such information to determine a power adjustment request. The third circuit module 140 may then communicate the determined power adjustment request to power supply circuitry to request that the power supply circuitry modify various aspects of supplied electrical power.

In another exemplary scenario where the third circuit module 140' is external to the integrated circuit 110, the third circuit module 140' may receive information regarding the at least one monitored power characteristic from the integrated circuit 110 (e.g., originating at the second sub-module 134) and process such information to determine a power adjustment command. The third circuit module 140' may then communicate the determined power adjustment command to power supply circuitry to cause the power supply circuitry to modify various aspects of supplied electrical power.

In a further exemplary scenario where the third circuit module 140' is external to the integrated circuit 110 and internal to a power supply integrated circuit, the third circuit module 140' of the power supply integrated circuit may receive information regarding the at least one monitored power characteristic from the integrated circuit 110 (e.g., originating at the second sub-module 134) and process such information to determine a power adjustment signal. The third circuit module 140' of the power supply integrated circuit may then utilize the power adjustment signal to cause the power supply integrated circuit to modify various aspects of electrical power output from the power supply integrated circuit.

In general, the third circuit module 140, 140' may be internal to the integrated circuit 110, external to the integrated circuit 110, an independent integrated circuit, part of a power supply integrated circuit, etc. Accordingly, the scope of various aspects of the present invention should not be limited by characteristics of a particular circuit location or circuit integration.

As mentioned previously, the third circuit module 140 may receive information of one or more monitored power characteristics for electrical power received by a plurality of modules and/or integrated circuits. In processing the received information to determine power supply control information, the third circuit module 140 may process the received information in any of a large variety of ways.

For example and without limitation, the third circuit module 140 may arbitrate between various modules and/or integrated circuits. Such arbitration may, for example, comprise considering respective power supply needs of the plurality of modules and/or integrated circuits. Such arbitration may, for example, comprise considering respective priorities of the plurality of modules and/or integrated circuits. For example, such arbitration may comprise determining power control information in accordance with the power supply needs of the highest priority module. Also for example, such arbitration may comprise determining power control information based on a priority-based or need-based weighted average. In general, such arbitration may comprise arbitrating between power supply needs of various modules and/or integrated circuits. Accordingly, the scope of various aspects of the present invention should not be limited by characteristics of a particular arbitration scheme.

The third circuit module 140 may communicate power control information to power supply circuitry that provides electrical power to the integrated circuit 110, first circuit module 120, or other circuit module or integrated circuit. Such power control information may, for example, comprise controlling signals that directly control operation of the power supply circuitry. Such power control information may, for example, comprise a power supply request or command, which may be interpreted and processed by power supply circuitry that receives such a request or command. Such power control information may, for example, comprise any of a variety of information related to monitored characteristics of electrical power received by the integrated circuit 110, first circuit module 120, other circuit module(s), other integrated circuit(s), etc. Accordingly, the scope of various aspects of the present invention should not be limited by characteristics of particular power control information or by a particular destination for such power control information.

The exemplary system 100 illustrated in FIG. 1 and discussed previously is merely exemplary and was presented to illustrate a non-limiting portion of various aspects of the present invention. Accordingly, the scope of various aspects of the present invention should by no means be limited by characteristics of the exemplary system 100.

Figure 2:
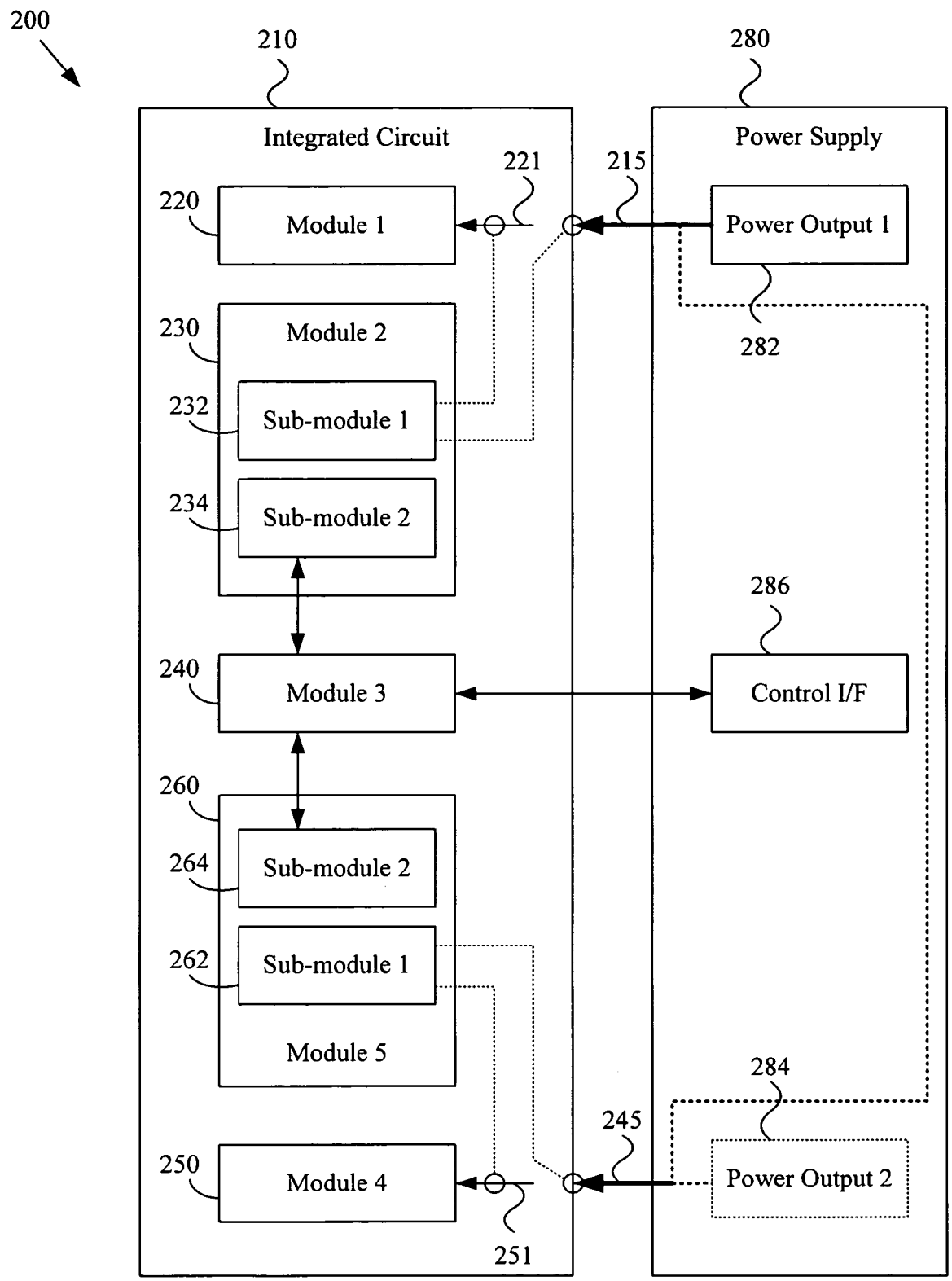
FIG. 2 shows a diagram of an exemplary power control system, in accordance with various aspects of the present invention.

FIG. 2 shows a diagram of an exemplary power control system 200, in accordance with various aspects of the present invention. The exemplary system 200 may, for example and without limitation, share various characteristics with the exemplary system 100 illustrated in FIG. 1 and discussed previously.

The exemplary system 200 may comprise an integrated circuit 210 that receives electrical power 215, 245. Portions of the exemplary integrated circuit 210 may, for example, share various characteristics with the exemplary integrated circuit 110 of the system 100 illustrated in FIG. 1 and discussed previously.

The exemplary system 200 may comprise a power supply circuit 280 that provides electrical power 215, 245 to the integrated circuit 210. The exemplary power supply circuit 280 may comprise a first power output module 282 that outputs electrical power 215 to the integrated circuit 210 and/or one or more modules thereof. The exemplary power supply circuit 280 may also, for example, comprise a second power output module 284 that outputs electrical power 245 to the integrated circuit 210. Note that the second power output 245 from the power supply circuit 280 may, for example, be output from the second power output module 284 or may (as indicated by the dashed line) be output from the first power output module 282. Accordingly, the second power output 245 from the power supply circuit 280 may be related to the first power output 215 or may be independent.

The exemplary power supply circuit 280 may, for example, comprise a control interface module 286 through which electrical devices external to the power supply circuit 280 may communicate with the power supply circuit 280. For example and without limitation, electrical devices external to the power supply circuit 280 may utilize the control interface module 286 to communicate power control information with the power supply circuit 280.

The power supply circuit 280 may comprise any of a large variety of power supply circuit characteristics. For example and without limitation, the power supply circuit 280 may be an independent power supply integrated circuit. The power supply circuit 280 may, for example, comprise discrete active and passive electrical components. The power supply circuit 280 may, for example, comprise one or more linear or non-linear regulators. The power supply circuit 280 may, for example, comprise analog, digital or hybrid circuitry. The power supply circuit 280 may, for example, comprise one or more independently controllable outputs. Accordingly, the scope of various aspects of the present invention should not be limited by characteristics of a particular type of power supply circuit.

The exemplary integrated circuit 210 may comprise a first circuit module 220 that receives electrical power 221. The first circuit module 220 may, for example and without limitation, share various characteristics with the first circuit module 120 of the exemplary system 100 illustrated in FIG. 1 and discussed previously.

Similarly, the exemplary integrated circuit 210 may comprise a second circuit module 230. The second circuit module 230 may, for example and without limitation, share various characteristics with the second circuit module 130 of the exemplary system 100 illustrated in FIG. 1 and discussed previously.

Further, the exemplary integrated circuit 210 may comprise a third circuit module 240. The third circuit module 240 may, for example and without limitation, share various characteristics with the third circuit module 140 of the exemplary system 100 illustrated in FIG. 1 and discussed previously.

The exemplary integrated circuit 210 may comprise a fourth circuit module 250 that receives electrical power 251. The fourth circuit module 250 may, for example and without limitation share various characteristics with the first circuit module 220.

The electrical power 251 received by the fourth circuit module 250 may, for example, be identical to the electrical power 245 received by the integrated circuit 210 or may be different. For example, the electrical power 251 received by the fourth circuit module 250 may be related to (e.g., derived from) the electrical power 245 received by the integrated circuit 210 or may be independent. Also for example, the electrical power 251 received by the fourth circuit module 250 may be related to the electrical power 215 received by the integrated circuit 210 or the electrical power 221 received by the first circuit module 220 or may be independent. Accordingly, the scope of various aspects of the present invention should not be limited by characteristics of any relationship between electrical power 215, 245 received by the integrated circuit 210, electrical power 221, 251 received by the first circuit module 221 and fourth circuit module 250, or electrical power received by any other module or component.

The fourth circuit module 250 may, for example, comprise characteristics of any of a large variety of circuit modules. For example and without limitation, the fourth circuit module 250 may comprise a signal processing module, a microprocessor module, an application-specific module, a programmable logic array module, a memory module, a plurality of coupled sub-modules, a microcontroller module, etc. Accordingly, the scope of various aspects of the present invention should not be limited by characteristics of a particular circuit module type.

The exemplary system 200 may comprise a fifth circuit module 260. The fifth circuit module 260 may, for example and without limitation, share various characteristics with the second circuit module 230.

For example, the exemplary fifth circuit module 260 may comprise a first sub-module 262 and a second sub-module 264. The fifth circuit module 260 may, for example and without limitation, comprise a power monitor module that monitors characteristics of electrical power and communicates information related to such monitoring activity.

The first sub-module 262 may, for example, monitor at least one characteristic of electrical power 245 received by the integrated circuit 210. Also for example, the first sub-module 262 may monitor at least one characteristic of electrical power 251 received by the fourth circuit module 250. Note that the first sub-module 262 may monitor at least one characteristic of electrical power received by the integrated circuit 210 and/or the fourth circuit module 250.

It should be noted that the first sub-module 262 may monitor one or more characteristics for a plurality of electrical power inputs received by at least one of the integrated circuit 210 and the fourth circuit module 250. For example, the fourth circuit module 250 may receive a plurality of electrical power inputs (e.g., a 1.0V input, 1.2V input and 2.5V input), characteristic(s) of which the first sub-module 262 may monitor. Accordingly, the scope of various aspects of the present invention should not be limited by a particular number of monitored power inputs to an integrated circuit and/or circuit module.

Note that the first sub-module 262 may utilize any of a large variety of known or yet to be developed devices to monitor electrical power characteristics. Accordingly, the scope of various aspects of the present invention should not be limited by characteristics of particular devices or methods for monitoring various electrical power characteristics.

The exemplary system 200 illustrates the first sub-module 262 monitoring at least one characteristic of electrical power received by the integrated circuit 210 and/or the fourth circuit module 250. The first sub-module 262 may also, for example, monitor at least one characteristic of electrical power received by other circuit modules of the integrated circuit 210. Accordingly, the scope of various aspects of the present invention should not be limited by a particular number of circuit modules for which characteristics of received electrical power may be monitored by the first sub-module 262.

The fourth circuit module 260 of the exemplary system 100 may comprise a second sub-module 264, communicatively coupled to the first sub-module 262, that communicates with the third circuit module 240 regarding the at least one received power characteristic monitored by the first sub-module 262. As illustrated in FIG. 2, the third circuit module 240 may be internal to the integrated circuit 210. However, the third circuit module 240 need not be internal to the integrated circuit 210. The scope of various aspects of the present invention should not be limited by a particular location of the third circuit module 240.

The second sub-module 264 may communicate information with the third circuit module 240. Such information may, for example, comprise information of the at least one monitored received power characteristic. In an exemplary scenario where the first sub-module 262 monitors a voltage level characteristic of electrical power received by the fourth circuit module 250, the second sub-module 264 may communicate information regarding the monitored voltage level with the third circuit module 240. For example, such information may comprise information (relative or absolute) describing the monitored voltage level. Such information may, for example, comprise relatively low-resolution information (e.g., a one-bit threshold comparison indication) or relatively high-resolution information (e.g., millivolt level resolution).

Also for example, the second sub-module 264 may communicate information with the third circuit module 240 that comprises power adjustment information. In an exemplary scenario where the first sub-module 262 monitors a voltage ripple characteristic, the second sub-module 264 may communicate information to the third circuit module 240 indicating that the voltage ripple level should be reduced. Such power adjustment information may, for example, comprise a request for power adjustment or a command for power adjustment.

As mentioned previously, the first sub-module 262 may monitor a plurality of received power characteristics for a plurality of received power inputs for a plurality of circuit modules. Accordingly, the second sub-module 264 may communicate information with the third circuit module 240 regarding any, some or all of such monitored characteristics.

In general, the second sub-module 264 may communicate with the third circuit module 240 regarding the at least one characteristic of received power monitored by the first sub-module 262. Accordingly, the scope of various aspects of the present invention should not be limited by characteristics of a particular monitored received power characteristic or particular types of information that may be communicated regarding a monitored power characteristic.

As mentioned previously, the exemplary system 200 may comprise a third circuit module 240 with which the second sub-module 264 may communicate information regarding the at least one monitored power characteristic. For example and without limitation, the third circuit module 240 may comprise a power controller module. For example, the third circuit module 240 may process information received from the second sub-module 264 to determine power control information utilized to control power supply circuitry.

In an exemplary scenario, the third circuit module 240 may receive information regarding the at least one monitored power characteristic from the second sub-module 264 and process such information to determine a power adjustment request (or command). The third circuit module 240 may then communicate the determined power adjustment request to power supply circuitry to request that the power supply circuitry modify various aspects of supplied electrical power. For example, the third circuit module 240 may communicate a power adjustment request through the control interface module 286 to at least one of the first power output module 282 and the second power output module 284 of the power supply circuit 280. The power supply circuit 280 may then, for example, respond to the communicated power adjustment request (or command) by adjusting one or more characteristics of electrical power output from the power supply circuit 280.

As mentioned previously, the third circuit module 240 may receive information regarding one or more monitored power characteristics for electrical power received by a plurality of modules and/or integrated circuits. In processing the received information to determine power supply control information, the third circuit module 240 may process the received information in any of a large variety of ways.

For example and without limitation, the third circuit module 240 may arbitrate between various modules and/or integrated circuits. Such arbitration may, for example, comprise considering respective power supply needs of the plurality of modules and/or integrated circuits. Such arbitration may, for example, comprise considering respective priorities of the plurality of modules and/or integrated circuits. For example, such arbitration may comprise determining power control information in accordance with the power supply needs of the highest priority module. Also for example, such arbitration may comprise determining power control information based on a priority-based or need-based weighted average.

In an exemplary scenario, the third circuit module 240 may receive information regarding monitored power characteristics from the second sub-module 234 of the second circuit module 230 and from the second sub-module 264 of the fifth circuit module 260. The third circuit module 240 may, in the exemplary scenario, determine that the power supply needs of the first circuit module 220 outweigh the power supply needs of the fourth circuit module 250, and determine power supply control information based on the needs of the first circuit module 220 and the information regarding the monitored power characteristics received from the second circuit module 230.

Alternatively, for example, the third circuit module 240 may, in an exemplary scenario, determine that the needs of the first circuit module 220 and the fourth circuit module 250 are equal, and determine power supply control information based equally on the power supply needs of the first circuit module 220 and monitored power characteristics received from the second circuit module 230, and on the power supply needs of the fourth circuit module 250 and monitored power characteristics received from the fifth circuit module 260.

In general, such arbitration may comprise arbitrating between power supply needs of various modules. Accordingly, the scope of various aspects of the present invention should not be limited by characteristics of a particular arbitration scheme.

The third circuit module 240 may communicate power control information to the power supply circuit 280 that provides electrical power to the integrated circuit 210, first circuit module 220, fourth circuit module 250 or other circuit module or integrated circuit. The third circuit module 240 may, for example, communicate power control information to the power supply circuit 280 through the control interface module 286.

Such power control information may, for example, comprise controlling signals that directly control operation of the power supply circuit 280 (e.g., the first power output module 282 and/or the second power output module 284). Such power control information may, for example, comprise a power supply request or command, which may be interpreted and processed by power supply circuit 280 (e.g., the control interface module 286) that receives such a request or command. Such power control information may, for example, comprise any of a variety of information related to monitored characteristics of electrical power received by the integrated circuit 210, first circuit module 220, fourth circuit module 250, other circuit module(s), other integrated circuit(s), etc. Accordingly, the scope of various aspects of the present invention should not be limited by characteristics of particular power control information or by a particular destination for such power control information.

The exemplary system 200 illustrated in FIG. 2 and discussed previously is merely exemplary, and was presented to illustrate a non-limiting portion of various aspects of the present invention. Accordingly, the scope of various aspects of the present invention should by no means be limited by characteristics of the exemplary system 200.

Figure 3:
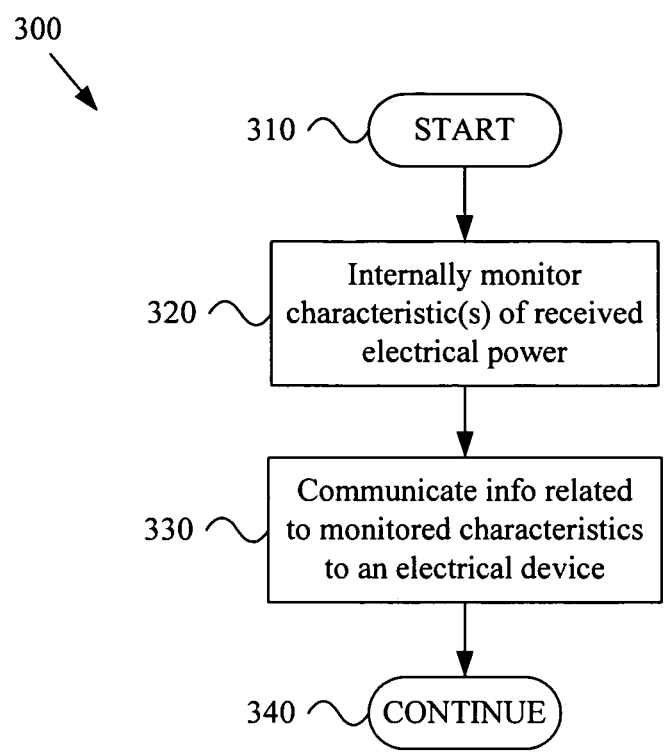
FIG. 3 illustrates an exemplary method for controlling power, in accordance with various aspects of the present invention.

FIG. 3 illustrates an exemplary method 300 for controlling power (e.g., in an integrated circuit), in accordance with various aspects of the present invention. The exemplary method 300 may, for example and without limitation, share characteristics with various functionality discussed previously with regard to the exemplary systems 100, 200 illustrated in FIGS. 1-2. Conversely, various modules of the exemplary systems 100, 200 illustrated in FIGS. 1-2 and discussed previously may perform various aspects of the functionality to be discussed regarding the exemplary method 300 illustrated in FIG. 3.

The exemplary method 300 may begin at step 310. The exemplary method 300 may begin in response to any of a large variety of causes and conditions. For example and without limitation, the method 300 may begin automatically when a system that is implementing the method 300 is powered up. Alternatively, for example, the method 300 may begin in response to an explicit command to begin (e.g., a command from another module in the system or from a user). Accordingly, the scope of various aspects of the present invention should not be limited by characteristics of any particular initiating events or conditions.

The exemplary method 300 may, at step 320, comprise monitoring at least one characteristic of electrical power received by at least one of an integrated circuit and a first circuit module of the integrated circuit. For example and without limitation, step 320 may comprise characteristics of the functionality performed by the first sub-module 132 of the exemplary system 100 illustrated in FIG. 1 and discussed previously.

The integrated circuit and/or first circuit module may comprise any of a large variety of integrated circuit or module characteristics. For example and without limitation, the integrated circuit and/or module may comprise signal processing circuitry, microprocessor circuitry, application-specific integrated circuitry, programmable logic array circuitry, memory circuitry, multi-chip module circuitry, microcontroller circuitry, etc. Accordingly, the scope of various aspects of the present invention should not be limited by characteristics of a particular integrated circuit or module type.

The electrical power received by the first circuit module of the integrated circuit may, for example, be identical to the electrical power received by the integrated circuit or may be different. For example, the electrical power received by the first circuit module may be related to (e.g., derived from) the electrical power received by the integrated circuit or may be independent. Accordingly, the scope of various aspects of the present invention should not be limited by characteristics of any relationship between electrical power received by the integrated circuit, the first circuit module of the integrated circuit, or any other module or component.

Monitored characteristics of electrical power may comprise any of a variety of electrical power characteristics. For example and without limitation, such characteristics may comprise electrical voltage characteristics such as, for example, voltage level (e.g., relative level or absolute level), voltage stability (e.g., voltage drift, voltage ripple and disturbance response characteristics), and noise. Also for example, such characteristics may comprise electrical current characteristics such as, for example, current level (e.g., relative level or absolute level), current stability (e.g., current fluctuation, current ripple, and disturbance response characteristics). Further for example, such characteristics may comprise various electrical power characteristics such as, for example, power level, energy level, etc. In general, the monitored characteristics of electrical power may comprise any of a variety of electrical power characteristics. Accordingly, the scope of various aspects of the present invention should not be limited by one or more particular electrical power characteristics.

It should be noted that exemplary step 320 may comprise monitoring one or more characteristics for a plurality of electrical power inputs received by at least one of the integrated circuit and the first circuit module of the integrated circuit. For example, the first circuit module may receive a plurality of electrical power inputs (e.g., a 1.0V input, 1.2V input and 2.5V input), characteristic(s) of which step 320 may comprise monitoring. Accordingly, the scope of various aspects of the present invention should not be limited by a particular number of monitored power inputs to an integrated circuit and/or circuit module.

Also, step 320 may comprise monitoring at least one characteristic of electrical power received by other circuit modules of the integrated circuit. Accordingly, the scope of various aspects of the present invention should not be limited by a particular number of circuit modules for which step 320 comprises monitoring at least one characteristic of received electrical power.

The exemplary method 300 may, at step 330, comprise communicating information related to the monitored at least one characteristic of electrical power with an electrical device. For example and without limitation, step 330 may comprise characteristics of the functionality performed by the second sub-module 134 of the exemplary system 100 illustrated in FIG. 1 and discussed previously. Such an electrical device may, for example and without limitation, be external to the integrated circuit. Also, in various non-limiting exemplary scenarios, such an electrical device may be internal to the integrated circuit.

The electrical device (e.g., external to the integrated circuit) may comprise any of a large variety of electrical device characteristics. For example and without limitation, the electrical device may comprise characteristics of the third circuit module 140, 140' of the exemplary system 100 illustrated in FIG. 1 and discussed previously. Also for example, the electrical device may comprise characteristics of the third circuit module 240 and/or control interface module 286 of the exemplary system 200 illustrated in FIG. 2 and discussed previously.

For example, the electrical device may comprise a power controller module. Such a power controller module may, for example, be an independent circuit module or an independent integrated circuit. Such a power controller module may, for example, be a component of a power supply circuit (e.g., a power supply integrated circuit). The electrical device may, for example, comprise a power supply circuit that provides power to the integrated circuit and/or the first circuit module of the integrated circuit. Accordingly, the scope of various aspects of the present invention should not be limited by characteristics of a particular electrical device (e.g., an electrical external to the integrated circuit).

The information related to the monitored at least one characteristic of electrical power may comprise any of a large number of information types. For example and without limitation, such information may comprise information of the at least one monitored characteristic. In an exemplary scenario where step 320 comprises monitoring a voltage level characteristic of electrical power received by the integrated circuit, step 330 may comprise communicating information regarding the monitored voltage level with the electrical device. For example, such information may comprise information (relative or absolute) describing the monitored voltage level. Such information may, for example, comprise relatively low-resolution information (e.g., a one-bit threshold comparison indication) or relatively high-resolution information (e.g., millivolt level resolution).

Also for example, step 330 may comprise communicating information with the electrical device that comprises power adjustment information. In an exemplary scenario where step 320 comprises monitoring a voltage ripple characteristic, step 330 may comprise communicating information to the electrical device indicating that the voltage ripple level should be reduced (e.g., by an increment or a particular amount). Such power adjustment information may, for example, comprise a request for power adjustment or a command for power adjustment.

Step 330 may, for example, also comprise determining the information to communicate to the electrical device. Such a determination may vary greatly in complexity. For example, in a first exemplary scenario, step 330 may comprise performing an array of signal processing and/or information communicating activities (e.g., A/D conversion, data manipulation, data packaging, one or two-way data communication, etc.). In a second exemplary scenario, step 330 may comprise merely forwarding the information obtained at step 320. Accordingly, the scope of various aspects of the present invention should not be limited by characteristics of particular degrees of information processing complexity. Additional exemplary aspects of determining the information to communicate to the electrical device will be discussed regarding the exemplary method 400 illustrated in FIG. 4.

As mentioned previously, step 320 may comprise monitoring a plurality of received power characteristics for a plurality of received power inputs for a plurality of circuit modules. Accordingly, step 330 may comprise communicating information with the electrical device regarding any, some or all of such monitored characteristics.

In general, exemplary step 330 may comprise communicating with an electrical device (e.g., external to the integrated circuit) regarding the at least one characteristic of received power monitored at step 320. Accordingly, the scope of various aspects of the present invention should not be limited by characteristics of a particular monitored power characteristic or particular types of information that may be communicated regarding a monitored power characteristic.

Figure 4:
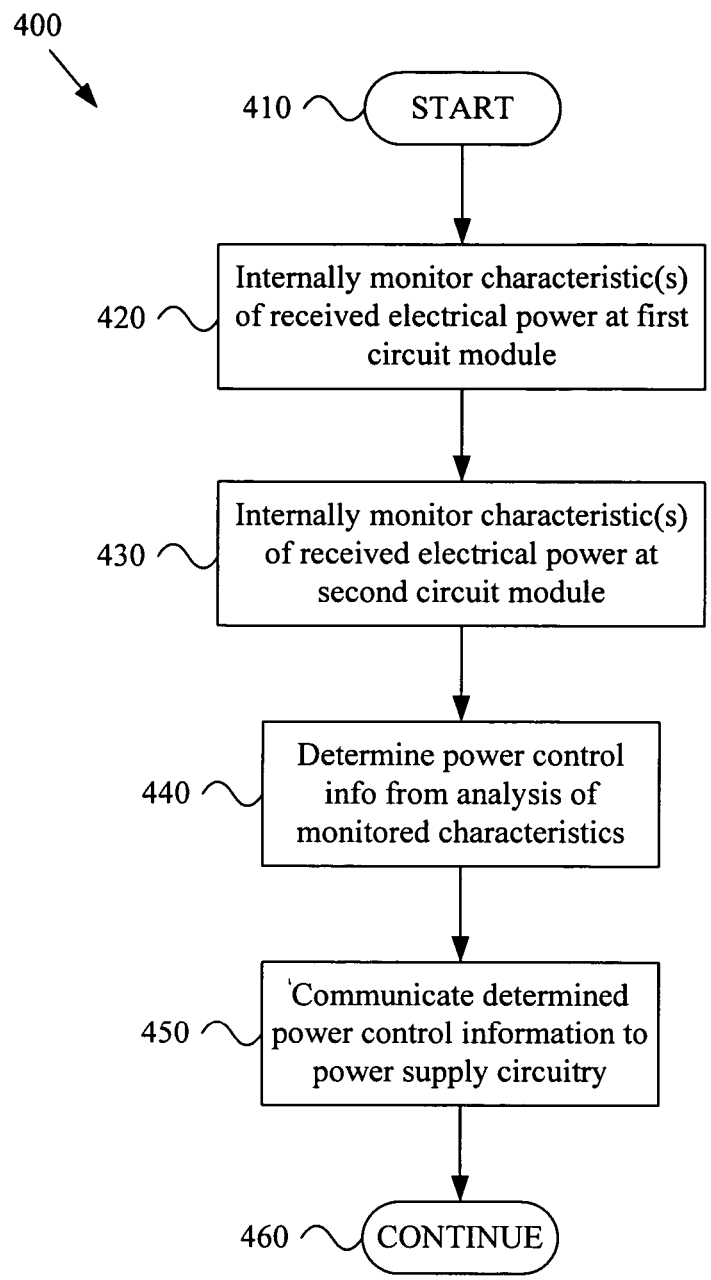
FIG. 4 illustrates an exemplary method for controlling power, in accordance with various aspects of the present invention.

FIG. 4 illustrates an exemplary method 400 for controlling power, in accordance with various aspects of the present invention. The exemplary method 400 may, for example and without limitation, share various characteristics with the exemplary method 300 illustrated in FIG. 3 and discussed previously. Further for example, the exemplary method 400 may share characteristics with various functionality discussed previously with regard to the exemplary systems 100, 200 illustrated in FIGS. 1-2 and discussed previously.

The exemplary method 400 may begin at step 410. The exemplary method 400 may begin in response to any of a large variety of causes and conditions. For example and without limitation, the method 400 may begin automatically when a system that is implementing the method 400 is powered up. Alternatively, for example, the method 400 may begin in response to an explicit command to begin (e.g., a command from another module in the system or from a user). Accordingly, the scope of various aspects of the present invention should not be limited by characteristics of any particular initiating events or conditions.

The exemplary method 400 may, at step 420, comprise monitoring (e.g., internal to an integrated circuit) at least one characteristic of electrical power received by at least one of the integrated circuit and a first circuit module of the integrated circuit. For example and without limitation, step 420 may share various characteristics with step 320 of the exemplary method 300 illustrated in FIG. 3 and discussed previously. Also for example, step 420 may share characteristics with the functionality performed by the first sub-module 132 of the exemplary system 100 illustrated in FIG. 1 and discussed previously and functionality performed by the first sub-module 232 of the second circuit module 230 of the exemplary system 200 illustrated in FIG. 2 and discussed previously.

The exemplary method 400 may, at step 430, comprise monitoring (e.g., internal to the integrated circuit) at least one characteristic of electrical power received by a second circuit module of the integrated circuit. For example, step 430 may share various characteristics with step 420, albeit with regard to a second circuit module rather than the first circuit module.

The exemplary method 400 may, at step 440, comprise determining power control information from an analysis of electrical power characteristics monitored at steps 420 and 430. For example and without limitation, step 440 may share various characteristics with the functionality discussed previously with regard to the second sub-module 134 and third circuit module 140 of the exemplary system 100 illustrated in FIG. 1 and discussed previously, and the third circuit module 240 of the exemplary system 200 illustrated in FIG. 2 and discussed previously.

Such power control information may, for example, comprise controlling signals that directly control operation of the power supply circuitry. Such power control information may, for example, comprise a power supply request or command, which may be interpreted and processed by power supply circuitry that receives such a request or command. Such power control information may, for example, comprise any of a variety of information related to monitored characteristics of electrical power monitored at steps 420 and 430. Accordingly, the scope of various aspects of the present invention should not be limited by characteristics of particular power control information.

Step 440 may comprise determining power control information by analyzing the electrical power characteristics monitored at steps 420 and 430 in any of a variety of ways. For example and without limitation, step 440 may comprise arbitrating between various modules and/or integrated circuits. Such arbitration may, for example, comprise considering respective power supply needs of the plurality of modules and/or integrated circuits. Such arbitration may, for example, comprise considering respective priorities of the plurality of modules and/or integrated circuits. For example, such arbitration may comprise determining power control information in accordance with the power supply needs of the highest priority module. Also for example, such arbitration may comprise determining power control information based on a priority-based or need-based weighted average.

In an exemplary scenario, step 440 may process information regarding characteristics of electrical power received at a first circuit module (e.g., as monitored at step 420) and information regarding characteristics of electrical power received at a second circuit module (e.g., as monitored at step 430). Step 440 may, in the exemplary scenario, determine that the power supply needs of the first circuit module outweigh the power supply needs of the second circuit module, and determine power supply control information based on the power supply needs of the first circuit module and the information regarding characteristics of electrical power received at the first circuit module.

In another exemplary scenario, step 440 may process information regarding characteristics of electrical power received at a first circuit module (e.g., as monitored at step 420) and information regarding characteristics of electrical power received at a second circuit module (e.g., as monitored at step 430). Step 440 may, in the exemplary scenario, determine that the power supply needs of the first circuit module are equal to the power supply needs of the second circuit module, and determine power supply control information based equally on the needs of the first circuit module and the information regarding characteristics of electrical power received at the first circuit module, and with the needs of the second circuit module and the information regarding characteristics of electrical power received at the second circuit module.

In still another exemplary scenario, step 440 may process information regarding characteristics of electrical power received at a first circuit module (e.g., as monitored at step 420) and information regarding characteristics of electrical power received at a second circuit module (e.g., as monitored at step 430). Step 440 may, in the exemplary scenario, determine that the power supply needs of the first circuit module are prioritized higher than the power supply needs of the second circuit module, and comprise determining power supply control information based on a priority-based weighted average of the needs of the first circuit module and the information regarding characteristics of electrical power received at the first circuit module, and the needs of the second circuit module and the information regarding characteristics of electrical power received at the second circuit module.

In general, exemplary step 440 may comprise determining power control information from an analysis of electrical power characteristics monitored at steps 420 and 430. Accordingly, the scope of various aspects of the present invention should not be limited by characteristics of a particular analysis or determination of power control information.

The exemplary method 400 may, at step 450, comprise communicating the power control information (e.g., as determined at step 440) to power supply circuitry that provides the electrical power to the first and second circuit modules. For example and without limitation, step 450 may share various characteristics with step 330 of the exemplary method 300 illustrated in FIG. 3 and discussed previously. Also for example, step 450 may share various characteristics with functionality performed by the second sub-module 134 and third circuit module 140 of the exemplary system illustrated in FIG. 1 and discussed previously, and with the third circuit module 240 of the exemplary system 200 illustrated in FIG. 2 and discussed previously.

The exemplary method 400 discussed above presents an exemplary illustration comprising monitoring characteristics of received electrical power at first and second circuit modules. It should be noted that various aspects of the exemplary illustration are readily extensible to systems comprising any number of circuit modules. Accordingly, the scope of various aspects of the present invention should not be limited to a particular number of circuit modules for which characteristics of received electrical power are monitored.

Figure 5:
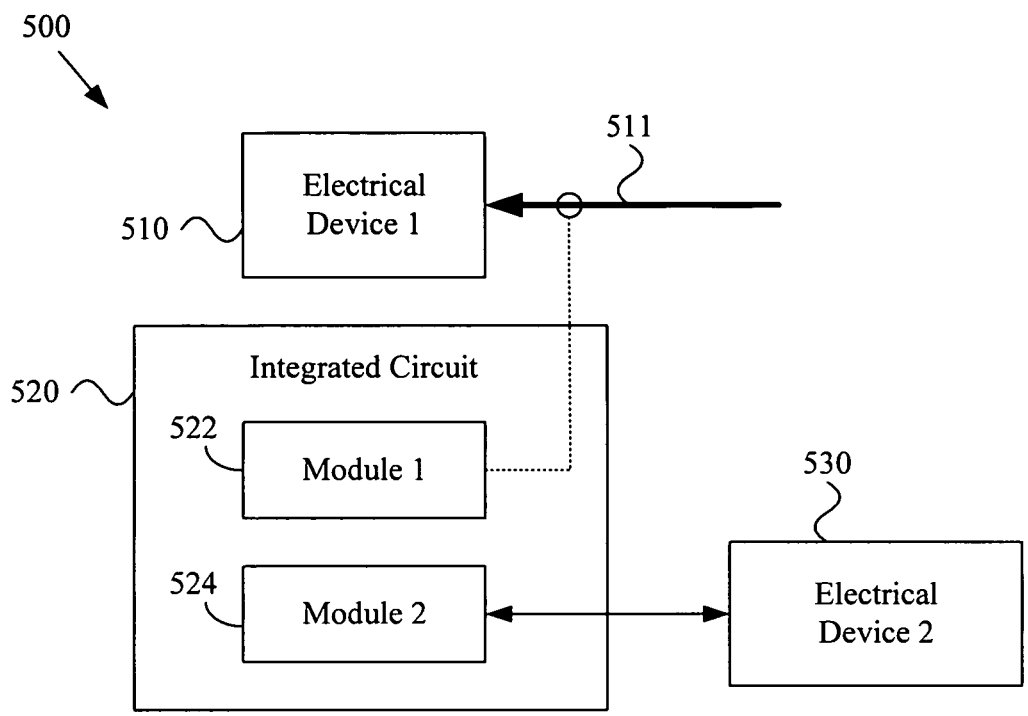
FIG. 5 shows a diagram of an exemplary power control system, in accordance with various aspects of the present invention.

FIG. 5 shows a diagram of an exemplary power control system 500, in accordance with various aspects of the present invention. For example and without limitation, the exemplary system 500 may share various characteristics with the exemplary systems 100, 200 illustrated in FIGS. 1-2 and discussed previously.

The exemplary system 500 may comprise a first electrical device 510 that receives electrical power 511. The first electrical device 510 may comprise characteristics of any of a large variety of electrical devices. For example and without limitation, the first electrical device 510 may comprise a signal processing circuit, a microprocessor, an application-specific integrated circuit, a programmable logic array, a memory circuit, a multi-chip module, a microcontroller, various combinations of active and/or passive components, etc. Accordingly, the scope of various aspects of the present invention should not be limited by characteristics of a particular electrical device type.

The exemplary system 500 may comprise an integrated circuit 520. The electrical device 510 may, for example, be external to the integrated circuit 520. The integrated circuit 520 may, in turn, comprise a first module 522, a second module 524 and a third module 526. The first module 522 may be communicatively coupled to the second module 524 and the third module 526.

For example and without limitation, the first module 522 may share various characteristics with the first sub-module 132 of the exemplary system 100 and the second sub-modules 234, 264 of the exemplary system 200, as illustrated in FIGS. 1-2 and discussed previously.

The exemplary first module 522 may, for example, comprise a power monitor module that monitors characteristics of electrical power and communicates information related to such monitoring activity. The first module 522 may monitor at least one characteristic of electrical power 511 received by the first electrical device 510.

As discussed previously, monitored characteristics of electrical power may comprise any of a variety of electrical power characteristics. For example and without limitation, such characteristics may comprise electrical voltage characteristics such as, for example, voltage level (e.g., relative level or absolute level), voltage stability (e.g., voltage drift, voltage ripple and disturbance response characteristics), and noise. Also for example, such characteristics may comprise electrical current characteristics such as, for example, current level (e.g., relative level or absolute level), current stability (e.g., current fluctuation, current ripple, and disturbance response characteristics). Further for example, such characteristics may comprise various electrical power characteristics such as, for example, power level, energy level, etc. In general, the monitored characteristics of electrical power may comprise any of a variety of electrical power characteristics. Accordingly, the scope of various aspects of the present invention should not be limited by characteristics of one or more particular electrical power characteristics.

It should be noted that the first module 522 may monitor one or more characteristics for a plurality of electrical power inputs 511 received by the first electrical device 510. For example, the first electrical device 510 may receive a plurality of electrical power inputs 511 (e.g., a 1.0V input, 1.2V input and 2.5V input), characteristic(s) of which the first module 522 may monitor. Accordingly, the scope of various aspects of the present invention should not be limited by a particular number of monitored power inputs to an electrical device.

Note that the first module 522 may utilize any of a large variety of known or yet to be developed devices to monitor electrical power characteristics. Accordingly, the scope of various aspects of the present invention should not be limited by characteristics of particular devices or methods for monitoring various electrical power characteristics.

The exemplary system 500 illustrates the first module 522 monitoring at least one characteristic of electrical power 511 received by the first electrical device 510. The first module 522 may also, for example, monitor at least one characteristic of electrical power received by other electrical devices. Accordingly, the scope of various aspects of the present invention should not be limited by a particular number of modules for which characteristics of received electrical power may be monitored by the first module 522.

The exemplary system 500 may comprise a second electrical device 530 (e.g., external to the integrated circuit 520). Various aspects of an exemplary second electrical device 530 will be discussed in more detail later.

The integrated circuit 520 may comprise a second module 524 that communicates with the second electrical device 530 regarding the at least one characteristic of electrical power monitored by the first module 522. For example and without limitation, the second module 524 may share various characteristics with the second sub-module 134 and third circuit module 140 of the exemplary system 100 and the second sub-modules 234, 264 and third circuit module 240 of the exemplary system 200, as illustrated in FIGS. 1-2 and discussed previously.

The second module 524 may communicate various types of information with the second electrical device 530. Such information may, for example, comprise information of the at least one monitored power characteristic. In an exemplary scenario where the first module 522 monitors a voltage level characteristic of electrical power received by the first electrical device 510, the second module 524 may communicate information regarding the monitored voltage level with the second electrical device 530. For example, such information may comprise information (relative or absolute) describing the monitored voltage level. Such information may, for example, comprise relatively low-resolution information (e.g., a one-bit threshold comparison indication) or relatively high-resolution information (e.g., millivolt level resolution).

Also for example, the second module 524 may communicate information with the second electrical device 530 that comprises power adjustment information. Such power adjustment information may, for example, comprise a request for power adjustment or a command for power adjustment. Such power adjustment information may comprise a request or command to adjust power according by a relative amount or to an absolute amount. In an exemplary scenario where the first module 522 monitors a voltage ripple characteristic, the second module 524 may communicate information to the second electrical device 530 indicating that the voltage ripple level should be reduced.

The complexity of the second module 524 may vary greatly. For example, in a first exemplary scenario, the second module 524 may comprise a plurality of signal processing sub-circuits, each of which performs a signal processing or communicating activity (e.g., A/D conversion, data manipulation, data packaging, one or two-way data communication, etc.). In a second exemplary scenario, the second module 524 may comprise a mere conduit (e.g., a wire or optical path) for information obtained by the first module 522. Accordingly, the scope of various aspects of the present invention should not be limited by characteristics of particular degrees of module complexity.

As mentioned previously, the first module 522 may monitor a plurality of received power characteristics for a plurality of received power inputs for a plurality of electronic devices. Accordingly, the second module 524 may communicate information with the second electrical device 530 regarding any, some or all of such monitored characteristics.

In general, the second module 524 may communicate with a second electrical device 530, external to the integrated circuit 520, regarding the at least one characteristic of electrical power monitored by the first module 522. Accordingly, the scope of various aspects of the present invention should not be limited by characteristics of a particular monitored power characteristic or a particular type of information that may be communicated regarding a monitored power characteristic.

As mentioned previously, the exemplary system 500 may comprise a second electrical device 530, with which the second module 524 may communicate information regarding the at least one monitored power characteristic. The second electrical device 530 may comprise any of a large variety of electrical device characteristics. For example and without limitation, the second electrical device 530 may comprise a power controller module.

For example, the second electrical device 530 may process information received from the second module 524 to determine power control information utilized to control power supply circuitry. Alternatively for example, in a scenario where the information received from the second module 524 already comprises power control information, the second electrical device 530 may forego such a determination.

In an exemplary scenario, the second electrical device 530 may receive information regarding the at least one monitored power characteristic from the integrated circuit 520 (e.g., originating at the second module 524) and process such information to determine a power adjustment command. The second electrical device 530 may then communicate the determined power adjustment command to power supply circuitry to cause the power supply circuitry to modify various aspects of supplied electrical power. Such supplied electrical power may be directly related to the electrical power 511 received by the first electrical device 510.

In a further exemplary scenario where the second electrical device 530 is internal to a power supply circuit, the second electrical device 530 of the power supply circuit may receive information regarding the at least one monitored power characteristic from the integrated circuit 520 (e.g., originating at the second module 524) and process such information to determine a power adjustment signal. The second electrical device 530 of the power supply integrated circuit may then utilize the power adjustment signal to cause the power supply integrated circuit to modify various aspects of electrical power output from the power supply integrated circuit. Such supplied electrical power may be directly related to the electrical power 511 received by the first electrical device 510.

In general, the second electrical device 530 may be an independent integrated circuit, a portion of a power supply circuit, part of a power supply integrated circuit, etc. Accordingly, the scope of various aspects of the present invention should not be limited by characteristics of a particular second electrical device 530 location or a particular device integration with other circuitry.

As mentioned previously, the second electrical device 530 may receive information of one or more monitored power characteristics for electrical power received by a plurality of integrated circuits (or modules thereof). In processing the received information to determine power supply control information, the second electrical device 530 may process the received information in any of a large variety of ways.

For example and without limitation, the second electrical device 530 may arbitrate between various integrated circuits (or modules thereof). Such arbitration may, for example, comprise considering respective power supply needs of the plurality of modules and/or integrated circuits. Such arbitration may, for example, comprise considering respective priorities of the plurality of modules and/or integrated circuits. For example, such arbitration may comprise determining power control information in accordance with the power supply needs of the highest priority integrated circuit. Also for example, such arbitration may comprise determining power control information based on a priority-based or need-based weighted average. In general, such arbitration may comprise arbitrating between power supply needs of various modules and/or integrated circuits. Accordingly, the scope of various aspects of the present invention should not be limited by characteristics of a particular arbitration scheme.

The second electrical device 530 may, for example, communicate power control information to power supply circuitry that provides electrical power to the integrated circuit 520 or other module or integrated circuit. Such power control information may, for example, comprise controlling signals that directly control operation of the power supply circuitry. Such power control information may, for example, comprise a power supply request or command, which may be interpreted and processed by power supply circuitry that receives such a request or command. Such power control information may, for example, comprise any of a variety of information related to monitored characteristics of electrical power received by the first electrical device 510, other module(s), other integrated circuit(s), etc. Accordingly, the scope of various aspects of the present invention should not be limited by characteristics of particular power control information or by a particular destination for such power control information.

The exemplary system 500 illustrated in FIG. 5 and discussed previously is merely exemplary and was presented to illustrate a non-limiting portion of various aspects of the present invention. Accordingly, the scope of various aspects of the present invention should by no means be limited by characteristics of the exemplary system 500.

Figure 6:
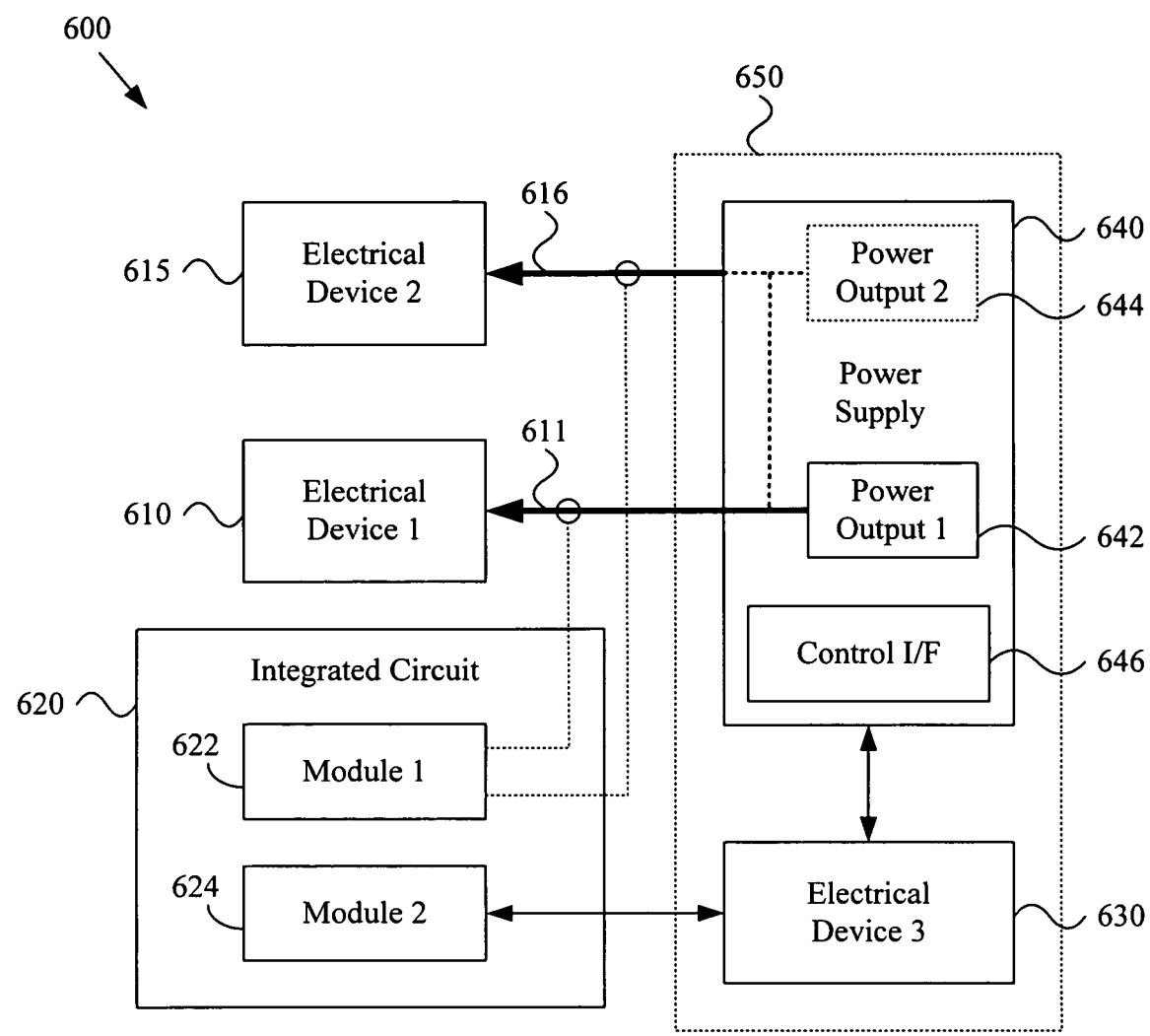
FIG. 6 shows a diagram of an exemplary power control system, in accordance with various aspects of the present invention.

FIG. 6 shows a diagram of an exemplary power control system 600, in accordance with various aspects of the present invention. The exemplary system 600 may, for example and without limitation share various characteristics with the exemplary system 500 illustrated in FIG. 5 and discussed previously.

The exemplary system 600 may comprise a first electrical device 610 that receives electrical power 611. The exemplary system 600 may also comprise a second electrical device 615 that receives electrical power 616. Such received electrical power 611, 616 may, for example, comprise electrical power received at a single power input or a plurality of power inputs. For example and without limitation, received electrical power may comprise power received at a plurality of electrical voltage levels.

The first and second electrical devices 610, 615 may comprise characteristics of any of a large variety of electrical devices. For example and without limitation, the first and second electrical devices 610, 615 may comprise signal processing circuitry, microprocessor circuitry, application-specific integrated circuitry, programmable logic array circuitry, a memory circuit, a plurality of coupled sub-circuits, a microcontroller circuit, etc. Accordingly, the scope of various aspects of the present invention should not be limited by characteristics of a particular circuit type.

The exemplary system 600 may comprise a power supply circuit 640 that provides electrical power to the first and second electrical devices 610, 615. The exemplary power supply circuit 640 may comprise a first power output module 642 that outputs electrical power to the first electrical device 610. The exemplary power supply circuit 640 may also, for example, comprise a second power output module 644 that outputs electrical power to the second electrical device 615. Note that the second power output from the power supply circuit 640 may, for example, be output from the second power output module 644 or may (as indicated by the dashed line) be output from the first power output module 642. Accordingly, the second power output from the power supply circuit 640 may be related to the first power output or may be independent.

The exemplary power supply circuit 640 may, for example, comprise a control interface module 646 through which electrical devices external to the power supply circuit 640 may communicate with the power supply circuit 640. For example and without limitation, electrical devices external to the power supply circuit 640 may utilize the control interface module 646 to communicate power control information to the power supply circuit 640.

The power supply circuit 640 may comprise any of a large variety of power supply circuit characteristics. For example and without limitation, the power supply circuit 640 may be an independent power supply integrated circuit. The power supply circuit 640 may, for example, comprise discrete active and passive electrical components. The power supply circuit 640 may, for example, comprise one or more linear or non-linear regulators. The power supply circuit 640 may, for example, comprise analog, digital or hybrid circuitry. The power supply circuit 640 may, for example, comprise one or more independently controllable outputs. Accordingly, the scope of various aspects of the present invention should not be limited by characteristics of a particular type of power supply circuit.

The exemplary integrated circuit 620 may comprise a first module 622 that monitors at least one characteristic of electrical power 611 received by the first electrical device 610. The first module 622 may also monitor at least one characteristic of electrical power 616 received by the second electrical device 615. The first module 622 may, for example and without limitation, share various characteristics with the first module 522 of the exemplary system 500 illustrated in FIG. 5 and discussed previously.

The exemplary integrated circuit 620 may comprise a second module 624 that communicates with a third electrical device 630 regarding the at least one characteristic of electrical power monitored by the first module 622. The second module 624 may, for example and without limitation, share various characteristics with the second module 524 of the exemplary system 500 illustrated in FIG. 5 and discussed previously.

As mentioned previously, the exemplary system 600 may comprise a third electrical device 630 with which the second module 624 may communicate information regarding the at least one monitored power characteristic. For example and without limitation, the third electrical device 630 may comprise a power controller module. For example, the third electrical device 630 may process information received from the second module 624 to determine power control information utilized to control power supply circuitry.

As illustrated in FIG. 6 with dashed line 650, the third electrical device 630 may be integrated with, or part of, the power supply circuit 640. Alternatively, the third electrical device 630 may be independent of the power supply circuit 640. Accordingly, the scope of various aspects of the present invention should not be limited by characteristics of a particular location or level of integration for the electrical device 630.

In an exemplary scenario, the third electrical device 630 may receive information regarding the at least one monitored power characteristic from the second module 624 and process such information to determine a power adjustment request (or command). The third electrical device 630 may then communicate the determined power adjustment request to the power supply circuit 640 to request that the power supply circuit 640 modify various aspects of supplied electrical power. For example, the third electrical device 630 may communicate a power adjustment request through the control interface module 646 to at least one of the first power output module 642 and the second power output module 644 of the power supply circuit 640. The power supply circuit 640 may then, for example, respond to the communicated power adjustment request (or command) by adjusting one or more characteristics of electrical power output from the power supply circuit 640.

As mentioned previously, the third electrical device 630 may receive information regarding one or more monitored power characteristics for electrical power received by a plurality of modules and/or integrated circuits. In processing the received information to determine power supply control information, the third electrical device 630 may process the received information in any of a large variety of ways.

For example and without limitation, the third electrical device 630 may arbitrate between various modules and/or integrated circuits. Such arbitration may, for example, comprise considering respective power supply needs of the plurality of modules and/or integrated circuits. Such arbitration may, for example, comprise considering respective priorities of the plurality of modules and/or integrated circuits. For example, such arbitration may comprise determining power control information in accordance with the power supply needs of the highest priority module. Also for example, such arbitration may comprise determining power control information based on a priority-based or need-based weighted average.

In an exemplary scenario, the third electrical device 630 may receive information regarding monitored power characteristics from the second module 624 of the integrated circuit 620. Such information may comprise information regarding monitored characteristics of power received by the first and second electrical devices 610, 615. The third electrical device 630 may, in the exemplary scenario, determine that the power supply needs of the first electrical device 610 outweigh the power supply needs of the second electrical device 615, and determine power supply control information based on the needs of the first electrical device 610 and the information regarding characteristics of power 611 received by the first electrical device 610.

Alternatively, for example, the third electrical device 630 may, in an exemplary scenario, determine that the needs of the first electrical device 610 and the second electrical device 615 are equal, and determine power supply control information based equally on the needs of the first electrical device 610 and associated information regarding characteristics of power 611 received by the first electrical device 610 and on the needs of the second electrical device 615 and associated information regarding characteristics of power 616 received by the second electrical device 615.

In general, such arbitration may comprise arbitrating between power supply needs of various modules. Accordingly, the scope of various aspects of the present invention should not be limited by characteristics of a particular arbitration scheme.

The third electrical device 630 may communicate power control information to the power supply circuit 640 that provides electrical power to the first and second electrical devices 610, 615 or other devices or circuits. The third electrical device 630 may, for example, communicate power control information to the power supply circuit 640 through the control interface module 646.

Such power control information may, for example, comprise controlling signals that directly control operation of the power supply circuit 640 (e.g., the first power output module 642 and/or the second power output module 644). Such power control information may, for example, comprise a power supply request or command, which may be interpreted and processed by power supply circuit 640 (e.g., the control interface module 646) that receives such a request or command. Such power control information may, for example, comprise any of a variety of information related to monitored characteristics of electrical power received by the first electrical device 610, second electrical device 615, other devices, modules and circuits, etc. Accordingly, the scope of various aspects of the present invention should not be limited by characteristics of particular power control information or by a particular destination for such power control information.

The exemplary system 600 illustrated in FIG. 6 and discussed previously is merely exemplary, and was presented to illustrate a non-limiting portion of various aspects of the present invention. Accordingly, the scope of various aspects of the present invention should by no means be limited by characteristics of the exemplary system 600.

Figure 7:
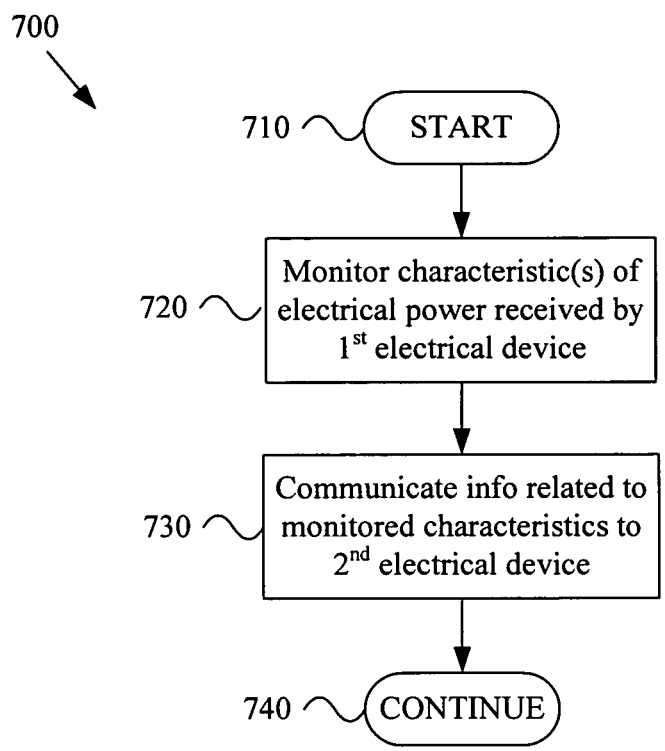
FIG. 7 illustrates an exemplary method for controlling power, in accordance with various aspects of the present invention.

FIG. 7 illustrates an exemplary method 700 for controlling power, in accordance with various aspects of the present invention. The exemplary method 700 may, for example and without limitation, share various characteristics with the functionality performed by the exemplary systems 500, 600 illustrated in FIGS. 5 and 6 and discussed previously.

The exemplary method 700 may begin at step 710. The exemplary method 700 may begin in response to any of a large variety of causes and conditions. For example and without limitation, the method 700 may begin automatically when a system that is implementing the method 700 is powered up. Alternatively, for example, the method 700 may begin in response to an explicit command to begin (e.g., a command from another module in the system or from a user). Accordingly, the scope of various aspects of the present invention should not be limited by characteristics of any particular initiating events or conditions.

The exemplary method 700 may, at step 720, comprise monitoring at least one characteristic of electrical power received by a first electrical device (e.g., external to the integrated circuit performing the method 700). For example and without limitation, step 720 may comprise characteristics of the functionality performed by the first module 522 of the exemplary integrated circuit 520 illustrated in FIG. 5 and discussed previously. Note, however, that in various non-limiting exemplary scenarios, the first electrical device may be internal to the integrated circuit performing the method 700.

The first electrical device may comprise any of a large variety of circuit characteristics. For example and without limitation, the first electrical device may comprise signal processing circuitry, microprocessor circuitry, application-specific integrated circuitry, programmable logic array circuitry, memory circuitry, multi-chip module circuitry, microcontroller circuitry, etc. Accordingly, the scope of various aspects of the present invention should not be limited by characteristics of a particular electrical device or circuit type.

Monitored characteristics of electrical power may comprise any of a variety of electrical power characteristics. For example and without limitation, such characteristics may comprise electrical voltage characteristics such as, for example, voltage level (e.g., relative level or absolute level), voltage stability (e.g., voltage drift, voltage ripple and disturbance response characteristics), and noise. Also for example, such characteristics may comprise electrical current characteristics such as, for example, current level (e.g., relative level or absolute level), current stability (e.g., current fluctuation, current ripple, and disturbance response characteristics). Further for example, such characteristics may comprise various electrical power characteristics such as, for example, power level, energy level, etc. In general, the monitored characteristics of electrical power may comprise any of a variety of electrical power characteristics. Accordingly, the scope of various aspects of the present invention should not be limited by one or more particular electrical power characteristics.

It should be noted that exemplary step 720 may comprise monitoring one or more characteristics for a plurality of electrical power inputs received by the first electrical device. For example, the first electrical device may receive a plurality of electrical power inputs (e.g., a 1.0V input, 1.2V input and 2.5V input), characteristic(s) of which step 720 may comprise monitoring. Accordingly, the scope of various aspects of the present invention should not be limited by a particular number of monitored power inputs to an electrical device.

Also, step 720 may comprise monitoring at least one characteristic of electrical power received by other electrical devices. Accordingly, the scope of various aspects of the present invention should not be limited by a particular number of electrical devices for which step 720 may comprise monitoring at least one characteristic of received electrical power.

The exemplary method 700 may, at step 730, comprise communicating information related to the monitored at least one characteristic of electrical power with a second electrical device (e.g., external to the first integrated circuit). For example and without limitation, step 730 may comprise characteristics of the functionality performed by the second module 524 of the exemplary system 500 illustrated in FIG. 5 and discussed previously. Note, however, that in various non-limiting exemplary scenarios, the second electrical device may be internal to the integrated circuit performing the method 700.

The second electrical device may comprise any of a large variety of electrical device characteristics. For example and without limitation, the second electrical device may share various characteristics with the second electrical device 530 of the exemplary system 500 illustrated in FIG. 5 and discussed previously. Also for example, the second electrical device may share various characteristics with the third electrical device 630 of the exemplary system 600 illustrated in FIG. 6 and discussed previously.

For example, the second electrical device may comprise a power controller module. Such a power controller module may, for example, be an independent module or an independent integrated circuit. Such a power controller module may, for example, be a component of a power supply circuit (e.g., a power supply integrated circuit). The second electrical device may, for example, comprise a power supply circuit that provides power to the first electrical device. Accordingly, the scope of various aspects of the present invention should not be limited by characteristics of a particular electrical device.

The information related to the monitored at least one characteristic of electrical power may comprise any of a large number of information types. For example and without limitation, such information may comprise information of the at least one monitored characteristic. In an exemplary scenario where step 720 comprises monitoring a voltage level characteristic of electrical power received by the first electrical device, step 730 may comprise communicating information regarding the monitored voltage level with the second electrical device. For example, such information may comprise information (relative or absolute) describing the monitored voltage level. Such information may, for example, comprise relatively low-resolution information (e.g., a one-bit threshold comparison indication) or relatively high-resolution information (e.g., millivolt level resolution).

Also for example, step 730 may comprise communicating information with the second electrical device that comprises power adjustment information. In an exemplary scenario where step 720 comprises monitoring a voltage ripple characteristic, step 730 may comprise communicating information to the second electrical device indicating that the voltage ripple level should be reduced (e.g., by an increment or a particular amount). Such power adjustment information may, for example, comprise a request for power adjustment or a command for power adjustment.

Step 730 may, for example, also comprise determining the information to communicate to the second electrical device. Such a determination may vary greatly in complexity. For example, in a first exemplary scenario, step 730 may comprise performing an array of signal processing and/or information communicating activities (e.g., A/D conversion, data manipulation, data packaging, one or two-way data communication, etc.). In a second exemplary scenario, step 730 may comprise merely forwarding the information obtained at step 720. Accordingly, the scope of various aspects of the present invention should not be limited by characteristics of particular degrees of information processing complexity. Additional exemplary aspects of determining the information to communicate to the second electrical device will be discussed regarding the exemplary method 800 illustrated in FIG. 8.

As mentioned previously, step 720 may comprise monitoring a plurality of received power characteristics for a plurality of received power inputs for a plurality of electrical circuits. Accordingly, step 730 may comprise communicating information with the second electrical device regarding any, some or all of such monitored characteristics.

In general, exemplary step 730 may comprise communicating with a second electrical device regarding the at least one characteristic of electrical power monitored at step 720. Accordingly, the scope of various aspects of the present invention should not be limited by characteristics of a particular monitored power characteristic or particular types of information that may be communicated regarding a monitored power characteristic.

Figure 8:
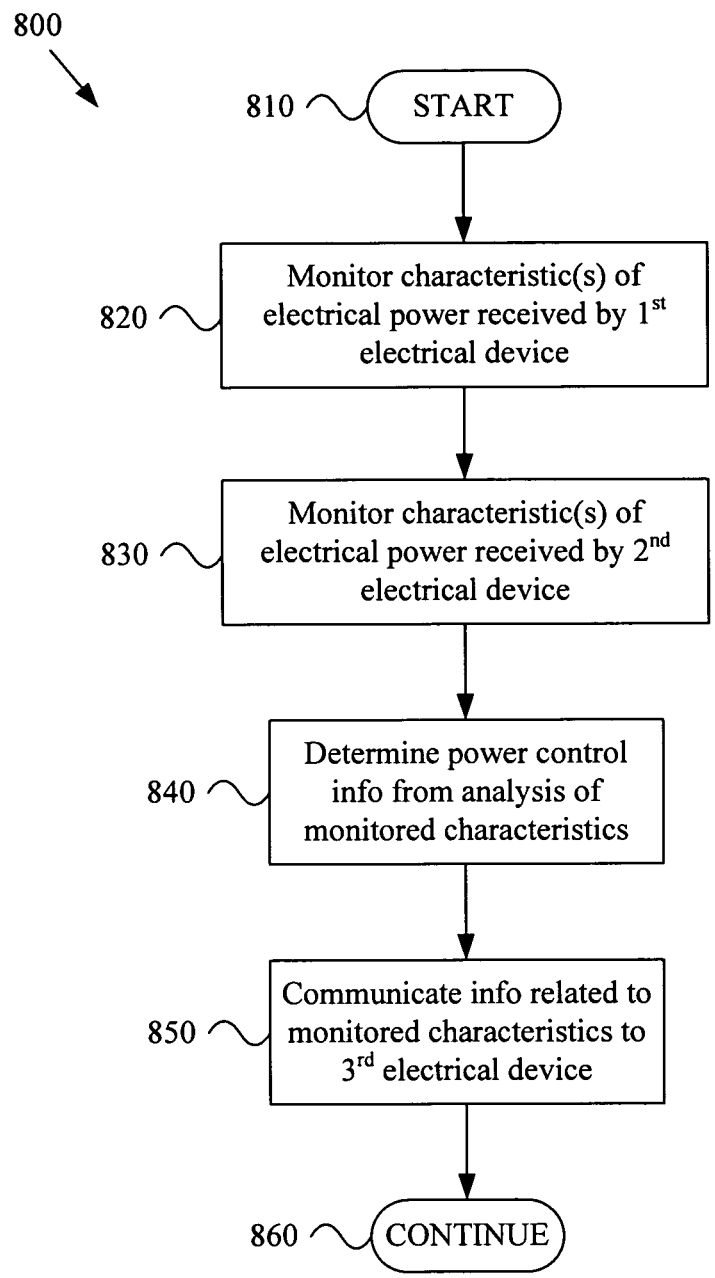
FIG. 8 illustrates an exemplary method for controlling power, in accordance with various aspects of the present invention.

FIG. 8 illustrates an exemplary method 800 for controlling power, in accordance with various aspects of the present invention. The exemplary method 800 may, for example and without limitation, share various characteristics with the exemplary method 700 illustrated in FIG. 7 and discussed previously. Further for example, the exemplary method 800 may share characteristics with various functionality discussed previously with regard to the exemplary systems 500, 600 illustrated in FIGS. 5-6 and discussed previously.

The exemplary method 800 may begin at step 810. The exemplary method 800 may begin in response to any of a large variety of causes and conditions. For example and without limitation, the method 800 may begin automatically when a system that is implementing the method 800 is powered up. Alternatively, for example, the method 800 may begin in response to an explicit command to begin (e.g., a command from another module in the system or from a user). Accordingly, the scope of various aspects of the present invention should not be limited by characteristics of any particular initiating events or conditions.

The exemplary method 800 may, at step 820, comprise monitoring at least one characteristic of electrical power received by a first electrical device (e.g., a device external to the integrated circuit performing the method 800). For example and without limitation, step 820 may share various characteristics with step 720 of the exemplary method 700 illustrated in FIG. 7 and discussed previously. Also for example, step 720 may share various characteristics with the functionality performed by the first module 522 of the exemplary system 500 illustrated in FIG. 5 and discussed previously and functionality performed by the first module 622 of the exemplary system 600 illustrated in FIG. 6 and discussed previously.

The exemplary method 800 may, at step 830, comprise monitoring at least one characteristic of electrical power received by a second electrical device (e.g., external to the integrated circuit performing the method 800). For example, step 830 may share various characteristics with step 820, albeit with regard to a second electrical device rather than the first electrical device.

The exemplary method 800 may, at step 840, comprise determining power control information from an analysis of electrical power characteristics monitored at steps 820 and 830. For example and without limitation, step 840 may share various characteristics with the functionality discussed previously with regard to the second electrical device 530 of the exemplary system 500 illustrated in FIG. 5 and discussed previously, and with the third electrical device 630 of the exemplary system 600 illustrated in FIG. 6 and discussed previously.

Such power control information may, for example, comprise controlling signals that directly control operation of power supply circuitry. Such power control information may, for example, comprise a power supply request or command, which may be interpreted and processed by power supply circuitry that receives such a request or command. Such power control information may, for example, comprise any of a variety of information types related to characteristics of electrical power monitored at steps 820 and 830. Accordingly, the scope of various aspects of the present invention should not be limited by characteristics of particular power control information.

Step 840 may comprise determining power control information by analyzing the electrical power characteristics monitored at steps 820 and 830 in any of a variety of ways. For example and without limitation, step 840 may comprise arbitrating between various electrical devices. Such arbitration may, for example, comprise considering respective power supply needs of the plurality of electrical devices. Such arbitration may, for example, comprise considering respective priorities of the electrical devices. For example, such arbitration may comprise determining power control information in accordance with the power supply needs of the highest priority electrical device. Also for example, such arbitration may comprise determining power control information based on a priority-based or need-based weighted average.

In an exemplary scenario, step 840 may comprise processing information regarding characteristics of electrical power received at a first electrical device (e.g., as monitored at step 820) and information regarding characteristics of electrical power received at a second electrical device (e.g., as monitored at step 830). Step 840 may, in the exemplary scenario, comprise determining that the power supply needs of the first electrical device outweigh the power supply needs of the second electrical device, and determining power supply control information based on the power supply needs of the first electrical device and the information regarding characteristics of electrical power received at the first electrical device.

In another exemplary scenario, step 840 may comprise processing information regarding characteristics of electrical power received at a first electrical device (e.g., as monitored at step 820) and information regarding characteristics of electrical power received at a second electrical device (e.g., as monitored at step 830). Step 840 may, in the exemplary scenario, comprise determining that the power supply priority of the first electrical device are equal to the power supply priority of the second electrical device, and comprise determining power supply control information based equally on the needs of the first electrical device and associated information regarding characteristics of electrical power received at the first electrical device and the needs of the second electrical device and associated information regarding characteristics of electrical power received at the second electrical device.

In still another exemplary scenario, step 840 may comprise processing information regarding characteristics of electrical power received at a first electrical device (e.g., as monitored at step 820) and information regarding characteristics of electrical power received at a second electrical device (e.g., as monitored at step 830). Step 840 may, in the exemplary scenario, comprise determining that the power supply needs of the first electrical device are prioritized higher than the power supply needs of the second electrical device, and determining power supply control information based on a priority-based weighted average of the needs of the first electrical device and associated information regarding characteristics of electrical power received at the first electrical device and the needs of the second electrical device and associated information regarding characteristics of electrical power received at the second electrical device.

In general, exemplary step 840 may comprise determining power control information from an analysis of electrical power characteristics monitored at steps 820 and 830. Accordingly, the scope of various aspects of the present invention should not be limited by characteristics of a particular analysis or determination of power control information.

The exemplary method 800 may, at step 850, comprise communicating the power control information (e.g., as determined at step 840) to power supply circuitry that provides the electrical power to the first and second modules. For example and without limitation, step 850 may share various characteristics with step 730 of the exemplary method 700 illustrated in FIG. 7 and discussed previously. Also for example, step 850 may share various characteristics with functionality performed by the second module 524 and second electrical device 530 of the exemplary system 500 illustrated in FIG. 5 and discussed previously, and with the second module 624 and third electrical device 630 of the exemplary system 600 illustrated in FIG. 6 and discussed previously.

The exemplary method 800 discussed above presents an exemplary illustration comprising monitoring characteristics of received electrical power at first and second modules. It should be noted that various aspects of the exemplary illustration are readily extensible to systems comprising any number of modules. Accordingly, the scope of various aspects of the present invention should not be limited to a particular number of modules for which characteristics of received electrical power are monitored.

The previous discussion has presented exemplary illustrations of various aspects of the present invention. At various times, the previous discussion has referred to circuits, electrical devices, modules and integrated circuits. Such terms may often be interchangeable. It should be noted that various aspects of the present invention may be performed by hardware, a processor executing software instructions, or a combination thereof. Further, various aspects of the present invention may be performed by local modules or sub-systems or by a distributed network of modules or sub-systems. For example, various aspects of the present invention may be performed by modules integrated into a single integrated circuit or by a set of integrated circuits. Accordingly, the scope of various aspects of the present invention should not be limited by characteristics of any particular implementation.

In summary, various aspects of the present invention provide a system and method for controlling characteristics of supplied electrical power.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An integrated circuit comprising:
a first circuit module configured to receive electrical power; and
a second circuit module comprising:
a first sub-module integrated within the second circuit module, the first sub-module configured to monitor at least one characteristic of electrical power received by the first circuit module, where the at least one characteristic of electrical power received by the first circuit module comprises a voltage characteristic; and
a second sub-module integrated within the second circuit module, the second sub-module communicatively coupled to the first sub-module and configured to receive the at least one characteristic of the electrical power received by the first circuit module, the second sub-module configured to communicate with a third circuit module, the third circuit module configured to arbitrate between power supply needs of a plurality of circuit modules based on a predetermined priority associated with each of the circuit modules and the at least one characteristic received by the first circuit module.

2. The integrated circuit of claim 1, where:
the second circuit module comprises a power monitor module;
and the third circuit module comprises a power controller module.

3. The integrated circuit of claim 1, where the third circuit module is external to the integrated circuit.

4. The integrated circuit of claim 1, where the third circuit module is a circuit module of a power supply circuit that is external to the integrated circuit.

5. The integrated circuit of claim 1, wherein the at least one characteristic of electrical power comprises a voltage level.

6. The integrated circuit of claim 1, wherein the at least one characteristic of electrical power comprises voltage stability.

7. The integrated circuit of claim 1, wherein the second sub-module is adapted to communicate information with the third circuit module, the information comprising information of the at least one monitored characteristic of received electrical power.

8. The integrated circuit of claim 1, wherein the second sub-module is adapted to communicate information to the third circuit module, the information comprising one or both of a command for a power adjustment and a request for a power adjustment.

9. An integrated circuit comprising: a first circuit module adapted to receive electrical power; and a second circuit module comprising:
a first sub-module adapted to monitor at least one characteristic of electrical power received by the first circuit module; and
a second sub-module, communicatively coupled to the first sub-module, adapted to communicate with a third circuit module regarding the at least one characteristic monitored by the first sub-module,
where the third circuit module is adapted to:
receive information regarding monitored characteristics of received electrical power from a plurality of modules, the plurality of modules comprising the second circuit module;
analyze the received information regarding the monitored characteristics of received electrical power from a plurality of modules to determine power control information;
arbitrate between respective power supply needs of the plurality of modules based on the monitored characteristics and a priority associated with each of respective modules; and
communicate the determined power control information to power supply circuitry that respectively provides the electrical power to the plurality of modules.

10. The integrated circuit of claim 9, where the third circuit module is adapted to analyze the received information regarding monitored characteristics of received electrical power from a plurality of modules to determine power control information by, at least in part, identifying a highest priority module of the plurality of modules and determining the power control information in accordance with power supply needs of the highest priority module.

11. A method for controlling electrical power provided to an integrated circuit, the method comprising:
in the integrated circuit:
a first sub-module of a second circuit module monitoring at least one characteristic of electrical power received by a first circuit module of the integrated circuit, where the at least one characteristic of electrical power comprises a voltage characteristic;
communicating information related to the monitored at least one characteristic of electrical power received by the first circuit module with an electrical device external to the integrated circuit, wherein the electrical device external to the integrated circuit is adapted to analyze received information regarding monitored characteristics of received electrical power from a plurality of modules to determine power control information by, at least in part, identifying a highest priority module of the plurality of modules and determining the power control information in accordance with power supply needs of the highest priority module.

12. The method of claim 11, wherein the external electrical device comprises a power controller module.

13. The method of claim 11, wherein the external electrical device comprises a power supply circuit that provides power to the integrated circuit.

14. The method of claim 11, wherein the at least one characteristic of electrical power comprises a voltage level.

15. The method of claim 11, wherein said communicating comprises communicating to the external electrical device one or both of a command for a power adjustment and a request for a power adjustment.

16. A method for controlling electrical power provided to an integrated circuit, the method comprising:
in the integrated circuit:
a first sub-module of a second circuit module monitoring at least one characteristic of electrical power received by a first circuit module of the integrated circuit; and communicating information related to the monitored at least one characteristic of electrical power with an electrical device external to the integrated circuit, and further comprising:

monitoring characteristics of electrical power received by a plurality of circuit modules, the plurality of circuit modules comprising the first circuit module;

analyzing information of the monitored characteristics of electrical power received by the plurality of circuit modules to determine power control information, where said analyzing comprises arbitrating between respective power supply needs of the plurality of circuit modules based on consideration of respective priorities and power supply needs of the plurality of circuit modules; and communicating the determined power control information to power supply circuitry that provides the electrical power to the plurality of circuit modules.

17. The method of claim 16, wherein said analyzing information of the monitored characteristics comprises identifying a highest priority circuit module of the plurality of circuit modules and determining the power control information in accordance with power supply needs of the highest priority circuit module.

18. An integrated circuit comprising:

a first circuit module configured to monitor at least one characteristic of electrical power received by a first electrical device that is external to the integrated circuit, where the at least one characteristic of electrical power comprises a voltage characteristic; and a second circuit module configured to communicate with the first circuit module and communicate with a second electrical device regarding the at least one characteristic of electrical power being monitored by the first circuit module, the second electrical device being external to the integrated circuit and being a different device than the first electrical device, and the second electrical device being configured to allocate power supply resources to the first electrical device based on predetermined priorities and the at least one characteristic of electrical power.

19. The integrated circuit of claim 18, wherein the second electrical device comprises a power controller circuit.

20. The integrated circuit of claim 19, wherein the second electrical device comprises a power supply circuit adapted to provide the electrical power received by the first electrical device.

21. The integrated circuit of claim 18, wherein the voltage characteristic comprises voltage stability.

22. The integrated circuit of claim 18, wherein the second module is configured to communicate information to the second electrical device, the information comprising one or both of a command for a power adjustment and a request for a power adjustment.

23. The integrated circuit of claim 18, wherein:

the first module is configured to monitor the at least one characteristic of electrical power received by a third electrical device that is external to the integrated circuit; and the second module is configured to process information of the monitored at least one characteristic for the first and third electrical devices to determine information communicated with the second electrical device.

24. The integrated circuit of claim 23, wherein the second module is adapted to process information of the monitored at least one characteristic for the first and third electrical devices to determine information communicated with the second electrical device by, at least in part, analysis of respective priorities of the first and third electrical devices, and communication of a request for an allocation of a supply of the electrical power between the first and third electrical devices according to the respective priorities.

25. In a first integrated circuit, a method for controlling electrical power provided to a first electrical device external to the first integrated circuit, the method comprising:

monitoring, with a circuit module of the first integrated circuit at least one characteristic of electrical power received by the first electrical device and by a third electrical device external to the first integrated circuit, where the at least one characteristic comprises a voltage characteristic; and communicating, between the circuit module and a second electrical device, information related to the monitored at least one characteristic of electrical power, wherein the second electrical device is external to the first integrated circuit, the first electrical device and the third electrical device; and analyzing respective priorities of the first and third electrical devices with the circuit module, and allocating a supply of electrical power between the first and third electrical devices according to the respective priorities.

26. The method of claim 25, wherein the second electrical device comprises a power controller circuit.

27. The method of claim 25, wherein the second electrical device comprises a power supply circuit that provides the electrical power to the first electrical device and the third electrical device.

28. The method of claim 25, wherein the voltage characteristic comprises voltage stability.

29. The method of claim 25, wherein the information related to the monitored at least one characteristic comprises information of the at least one monitored characteristic of electrical power.

30. The method of claim 25, wherein the information related to the monitored at least one characteristic comprises one or both of a command for a power adjustment and a request for a power adjustment, and said communicating comprises communicating the information to the second electrical device.

31. The method of claim 25, comprising processing information of the monitored at least one characteristic of electrical power received by the first electrical device and information of the monitored at least one characteristic of electrical power received by the third electrical device to determine information communicated with the second electrical device.

* * * * *